Aug. 9, 1932.   H. A. DENMIRE   1,871,120
APPARATUS FOR AND METHOD OF VULCANIZING TIRE CASINGS AND INNER TUBES

Filed April 30, 1927

INVENTOR
Harold A. Denmire
BY Evans & McCoy
ATTORNEYS

Patented Aug. 9, 1932

1,871,120

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

APPARATUS FOR AND METHOD OF VULCANIZING TIRE CASINGS AND INNER TUBES

Application filed April 30, 1927. Serial No. 187,712.

This invention relates to the vulcanization of inner tubes and tire casings and it particularly pertains to improved apparatus for and a method of vulcanizing inner tubes and tire casings.

One object of the present invention is to provide apparatus for and a method of concurrently vulcanizing an inner tube and a tire casing in the same molding cavity whereby the inner tube and tire casing are each given the desired smooth surface finish.

Another object of the invention is to provide an improved form of air bag for use in vulcanizing tire casings.

An additional object of the invention is to provide an improved method of vulcanizing inner tubes that gives the tubes increased toughness and improved wearing qualities.

Other objects of the invention will be apparent to those skilled in the art from a consideration of the accompanying drawing wherein.

Figure 1:
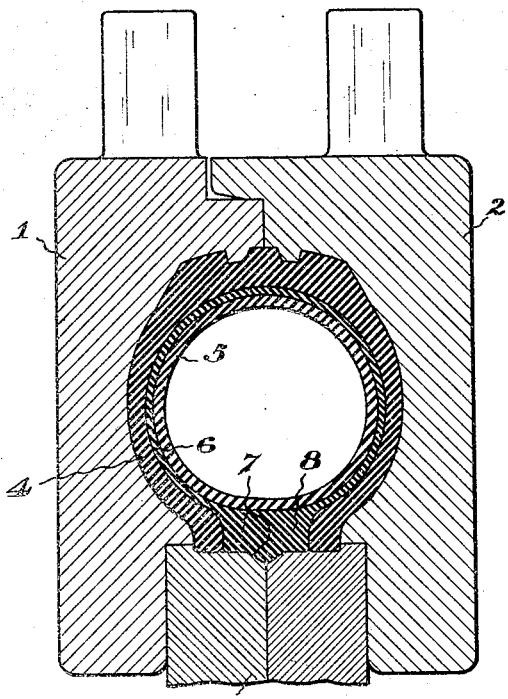
Figure 1 is a transverse, cross sectional view of an assembled mold, tire casing, air bag, and inner tube being vulcanized.
Figure 2:
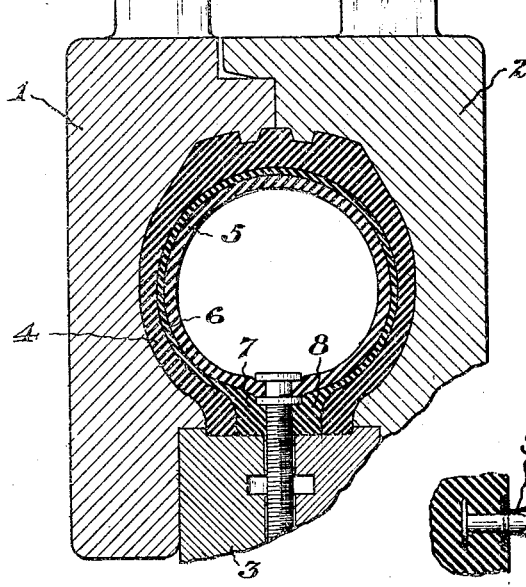
Fig. 2 is a corresponding cross sectional view of the assembly shown in Fig. 1, the section being taken through the inflation valve of the inner tube.

The mold assembly shown in Fig. 1 and Fig. 2 comprises a pair of mated mold sections 1 and 2 and a bull ring 3 that together define a molding cavity wherein a tire casing 4 is being vulcanized while subjected to inflation pressure from an uncured inner tube 5 that is also being vulcanized, and an air bag 6 that is interposed between the inner tube 5 and the tire casing 4. Inflation pressures of more than one hundred pounds per square inch are preferably used in order to obtain a dense and improved texture of side wall in the tube. Carbon dioxide gas or other inert gas is preferably used as the inflating medium in order to avoid oxidation of the rubber which sometimes results with the use of air at these high pressures.

The mold sections 1 and 2 and the bull ring 3 are of conventional design. In accordance with the present invention the inflation pressure for the tire casing is obtained by inflating the inner tube 5 within the air bag or cover 6 which encases the inner tube. The air bag 6 not only constitutes a medium for expanding the pneumatic tire casing 4 but it also constitutes a mold for the outer face of the inner tube 5. The air bag 6 is formed of a character of rubber that will withstand the repeated heats of vulcanization and that will also withstand the effects of sulphur migration from the contacting surfaces of the inner tube 5 and the tire casing 4. It is preferably formed with an outer and inner molding surface of high aluminum metal bronze content in accordance with my copending application Serial No. 187,713 filed April 30, 1927.

Figure 6:
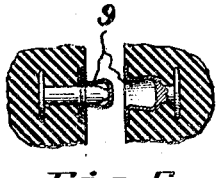
Fig. 6 is a detailed sectional view of the air bag showing one of the interlocking fasteners carried by the cooperating tongue portions of the bag.
Figure 4:
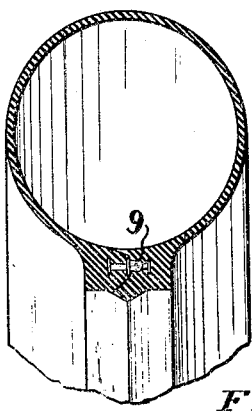
Fig. 4 is a detailed view in cross section with parts broken away, of the air bag after vulcanization.

The air bag 6 is open on its inner side around its entire circumference in order that the inner tube may readily be positioned therein. An annular laterally extending rib 7 that seats in a corresponding groove formed in the portion 8 of the bag serves to assist in interlocking the two side portions against radial misalignment and also serves to provide a smooth surface for the inner face of the tube. The interlocking portions 7 and 8 are desired although they are not essential and the character of split in the tongue of the air bag may be modified without departing from the spirit and scope of the invention which consists primarily in interposing a suitably surfaced member between the inner tube and the tire casing. The contacting faces of the portions 7 and 8 are also provided with a series of cooperating fasteners 9 that are vulcanized into the body of the bag for the purpose specified. The fasteners 9 are particularly shown in Fig. 6 of the drawing.

Figure 3:
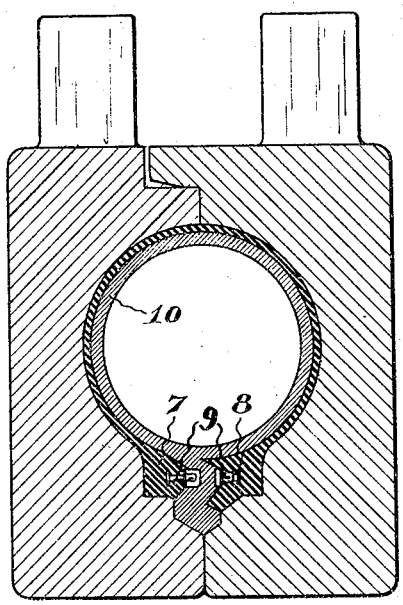
Fig. 3 is a transverse, cross sectional view of the mold for the air bag and the core member used in connection therewith.
Figure 5:
Fig. 5 is a transverse, cross sectional view of the uncured rubber slab used in forming the air bag.

Fig. 3 shows a suitable mold for forming the air bag from a flat sheet of rubber such, for instance, as that shown in Fig. 5. The sheet of rubber as shown in Fig. 5 is preferably delivered from an extruding machine substantially in the shape shown although it may be prepared in any other suitable manner. It is then wrapped about a suitable core 10 of the section shown in Fig. 3 after the fasteners 9 have been inserted in suitable cavities of the core and the unit is placed in a vulcanizing mold. The outer and inner molding surfaces of the bag are preferably treated with a protecting integument such for instance as the aluminum metal bronze disclosed in my aforesaid copending application. An air bag constructed in this manner has an opening around its entire inner periphery through which the inner tube may be inserted. It will also have an interlocking annular groove and flange formed in the cooperating parts of the tongue of the bag to facilitate the sealing of the bag around the inner tube when molding pressures are applied.

The molding faces of the air bag 6 may be provided with suitable markings for transfer to the inner tube or the inner tube may be marked in any other suitable way.

In using the apparatus described, the uncured inner tube 5 and air bag 6 with its fasteners 9 engaged are placed within the tire casing. After partial inflation of the inner tube the assembly is placed in a suitable heated mold. The inner tube is then inflated to sufficient degree to expel air from between the inner tube and the bag and also from between the bag and the tire casing. The mold is then closed and the assembled unit is subjected to molding heat and pressure. As heretofore stated, carbon dioxide is preferably used to inflate the inner tube and the inflation pressure increased materially over the inflation pressure commercially used in the curing of inner tubes at the present time. Any other suitable inflating medium may be used instead of the above mentioned carbon dioxide.

The advantages to be gained by vulcanizing tubes and casings in the manner described will be obvious to those skilled in the art. It will be apparent that the air bag or tube cover 6 constitutes a mold for the inner tube and that the outer face of the bag 6 constitutes a mold or core for the inner face of the tire casing. When these units are assembled as shown in Fig. 1 and Fig. 2 and the assembled structure is vulcanized, the outer surface of the tube 5 is smooth and the markings of the bag will be formed on the tube.

The advantages of practicing the invention will be apparent to those skilled in the art. Concurrent vulcanization of the casing and tube are obtained and the character of the finished tube is greatly improved because of its vulcanization on an inert gas at greatly increased pressures. The expense of using an inert gas is compensated for by the concurrent curing in a single mold unit of both casing and tube and the use of the inexpensive character of air bag proposed.

Although only one application of the invention is described for illustrative purposes, other modifications thereof will be obvious to those skilled in the art and I desire, therefore, that only such limitations shall be imposed on the invention as are presented by the prior art.

What I claim is:

1. The method of concurrently vulcanizing an inner tube and tire casing that consists in assembling the inner tube within the tire casing with a molding member which fits within the tire casing and completely encloses the inner tube, inflating the inner tube with a substantially inactive fluid and vulcanizing the casing and applying heat thereto to concurrently vulcanize the casing and inner tube.

2. An air bag unit having a hollow annular body of rubber composition, the side wall of said body being cut completely through around the inner portion thereof for removably receiving therein an inflatable member, and means for detachably fastening the edges of said body together.

3. A rubber air bag of the character described comprising an endless hollow body portion of annular form having its side walls separated by an endless split for the insertion within the bag of an inflatable member, and means for detachably fastening the edges of said body together.

4. An air bag of the character described comprising an endless body portion of annular form having its side wall separated by an endless split therein for the insertion within the bag of an inflatable member, and a plurality of cooperating fasteners carried by the engaging portions of said endless split for holding the edges of the split together during handling of the bag.

5. An air bag assembly for use in vulcanizing tire casings comprising a hollow annular bag cover of elastically extensible material having an exterior molding surface adapted to engage the interior of a tire casing throughout, and an inflatable member adapted to be received in said bag cover for expanding the same.

In testimony whereof I affix my signature.

HAROLD A. DENMIRE.